United States Patent [19]

Baumann et al.

[11] 4,406,334

[45] Sep. 27, 1983

[54] DRILLING TOOL

[75] Inventors: Otto Baumann, Leinfelden-Echterdingen; Hans-Peter Dohse, Grafenau; Wilbert Reibetanz, Leinfelden; Karl Wanner, Leinfelden-Echterdingen, all of Fed. Rep. of Germany

[73] Assignee: Robert Bosch GmbH, Stuttgart, Fed. Rep. of Germany

[21] Appl. No.: 299,773

[22] Filed: Sep. 4, 1981

[30] Foreign Application Priority Data

Nov. 3, 1980 [DE] Fed. Rep. of Germany ....... 3041315
Feb. 13, 1981 [DE] Fed. Rep. of Germany ....... 3105268

[51] Int. Cl.³ ............................................. E21B 12/00
[52] U.S. Cl. ..................................... 175/315; 175/40; 408/68; 408/204
[58] Field of Search ................ 175/315, 386, 403, 40; 408/14, 68, 202, 204, 206; 125/20

[56] References Cited

U.S. PATENT DOCUMENTS

| 1,234,467 | 7/1917 | Hamilton | 408/68 |
| 1,365,660 | 1/1921 | Collier | 408/68 X |
| 2,484,150 | 10/1949 | Brown | 408/204 |
| 2,886,291 | 5/1959 | Frisby | 175/40 |
| 3,833,073 | 9/1974 | Carver | 175/315 X |
| 4,078,622 | 3/1978 | Taylor-Myers | 175/386 X |
| 4,101,238 | 7/1978 | Reibetanz et al. | 408/204 X |

Primary Examiner—Ernest R. Purser
Assistant Examiner—Thuy M. Bui
Attorney, Agent, or Firm—Michael J. Striker

[57] ABSTRACT

A drilling tool has a drilling shaft member, a crown drilling member with an annular wall provided with a plurality of cutting edges and detachably mounted on the shaft member, a center drilling member detachably mounted on the shaft member inside the crown drilling member and having a further cutting edge, and elements for limiting a drilling depth of the tool when the center drilling member is mounted on the shaft member. Thereby, the operator of the drilling tool, after drilling a guiding groove in a rock, is forced to remove the center drilling member from the drilling tool and drill further without the center drilling member, which increases the drilling efficiency.

14 Claims, 13 Drawing Figures

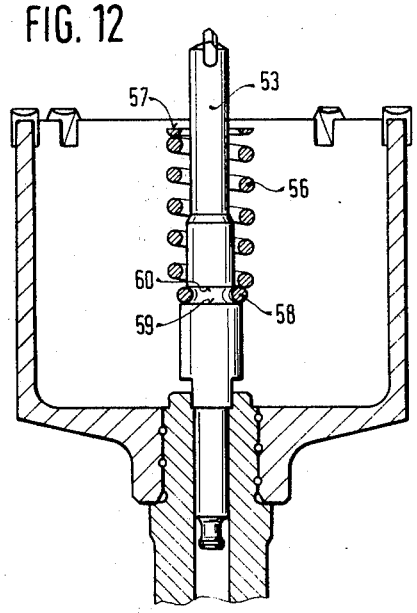
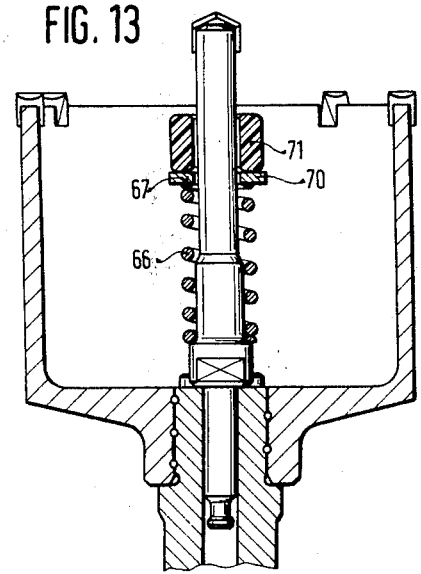

DRILLING TOOL

BACKGROUND OF THE INVENTION

The present invention relates to a drilling tool. More particularly, it relates to a drilling tool or bit which has a shaft member, a crown drilling member detachably connected with the shaft member and a center drilling member detachably connected with the shaft member and located in the interior of the crown drilling member.

Such drilling tools are known in the art and disclosed for example in the German Offenlegungsschrift No. 2,602,238. The center drilling member in the known drilling tool is screwed in a coaxial bore of the shaft member. The drilling tool operates in a satisfactory manner. It has been shown, however, that the drilling process in accordance with the diameter of the core drilling element can be considerably increased when after the initial drilling the central drilling element is removed from the tool. Then the entire impact energy of the hard alloy cutting edges of the ring-shaped crown drilling member can be transmitted to the lock to be drilled. This is true also for known drilling tools. It has been however recognized that many users of the drilling tool do not remove the center drilling means from the tool after the termination of the step of initial drilling.

SUMMARY OF THE INVENTION

Accordingly, it is an object of the present invention to provide a drilling tool which avoids the disadvantages of the prior art.

In keeping with these objects and with others which will become apparent hereinafter, one feature of the present invention resides, briefly stated in the fact that a drilling tool is provided with means for limiting a drilling depth of the tool when a central drilling member is mounted on the shaft member.

When the drilling tool is designed in accordance with the present invention, the center drilling member in mounted position can be utilized only for centering purposes. Then the center drilling member must be removed in order to make possible further operation with the crown drilling member. When the center drilling member is removed, the entire impact energy of the hammer drill can be transmitted via the cutting edges of the hollow crown drilling member to the rock to be drilled.

In accordance with an especially advantageous feature of the present invention, the limiting means may be formed as axial abutment means including a shoulder provided in the region of transition between a diameter of a drilling portion of the center drilling member and a greater supporting portion of the latter.

The novel features which are considered as characteristic for the invention are set forth in particular in the appended claims. The invention itself, however, both so to its construction and its method of operation, together with additional objects and advantages thereof, will be best understood from the following description of specific embodiments when read in connection with the accompanying drawings.

BRIEF DESCRIPTION OF THE DRAWING

FIGS. 11, 12 and 13 are views showing the center drilling member in accordance with further embodiments of the present invention.

DESCRIPTION OF THE PREFERRED EMBODIMENTS

Figure 1:
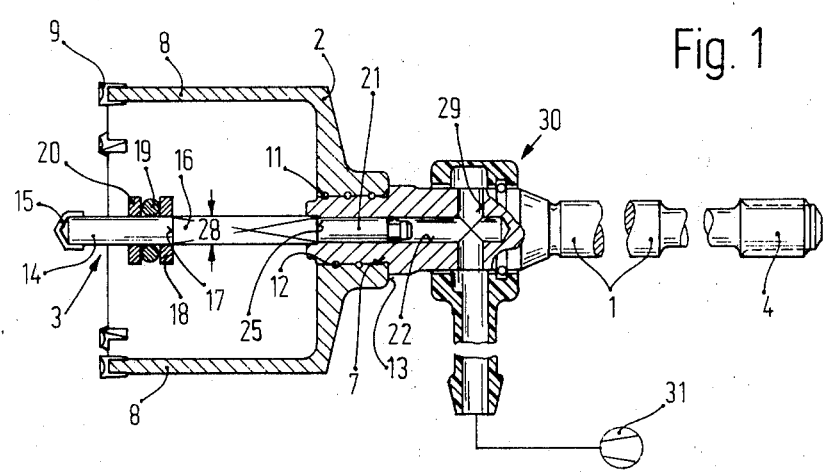
FIG. 1 is a view showing a drilling tool in accordance with a first embodiment of the invention.
Figure 2:
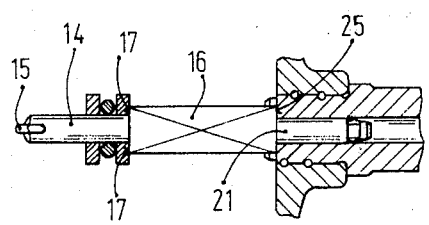
FIG. 2 is a view showing a fragment of the drilling tool of FIG. 1.
Figure 3:
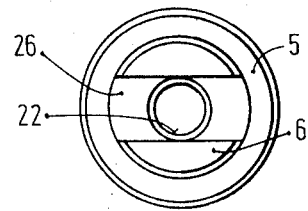
FIGS. 3 and 4 are views showing a holding portion of a shaft member of the drilling tool in two projections.
Figure 4:
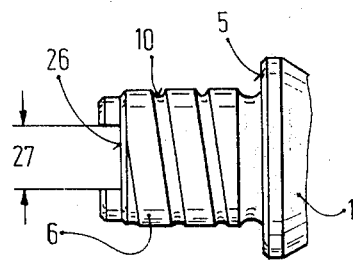
Figure 5:
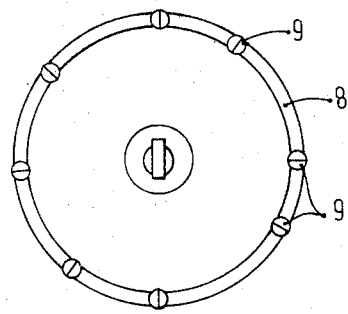
FIG. 5 is a front view of cutting edges of a crown drilling member of the drilling tool in accordance with the present invention.

A drilling tool in accordance with the present invention is shown in FIG. 1 and is composed substantially of three parts, namely a shaft member 1, a crown drilling member 2, and a center drilling member 3 concentrically arranged in the crown drilling member.

The shaft member 1 has a shank 4 which is receivable in a tool receiving portion of a hand-held power tool and is formed, for example, as a spline shaft. The shank 4 serves for transmission of axial impacts and a torque from the hand-held power tool to the shaft member 1.

The shaft member 1 has an end facing away from the shank, and the crown drilling member 2 is detachably mounted on this end. For this purpose, the shaft member 1 has a holding portion 6 which is axially limited by an annular shoulder 5. The crown drilling member 2 abuts against the annular shoulder 5 and has a receiving opening 7 with a cylindrical wall and a respective length. The holding portion 6 of the shaft member 1 is received in the receiving bore 7 of the crown drilling member 2. As can be be seen from FIG. 1, the crown drilling member 2 has a very good radial guidance in the shaft member 1 because of the relatively great axial length of the holding portion 6 and the receiving bore 7.

Figure 6:
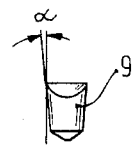
FIGS. 6 and 7 are views showing one of the cutting edges of FIG. 5.
Figure 7:
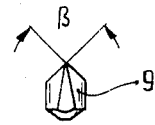

The crown drilling member 2 has a hollow cylindrical wall 8 with an end side provided with a plurality of cutting bodies 9. The cutting bodies 9 are mounted in a plurality of bores formed in the end face of the wall 8 of the crown drilling member and spaced from one another by irregular distances. The cutting bodies 9 are connected with the wall 8 for example by hard soldering. As can be seen from FIGS. 6 and 7, the cutting bodies 9 have a lateral setting angle which is equal of approximately 3°, and a cutting angle which is symmetrical to the axis of the cutting body and is equal to approximately 9°. Thereby the side angle and setting angle of the cutting bodies inserted into the crown drilling member are substantially identical. The laterally arranged setting angle prevents sizing of the drilling tool in the rock to be drilled.

Helical grooves 10 and 11 are provided on the holding portion 6 of the shaft member 1 and in the inner wall of the receiving bores 7 of the crown drilling member 2. The grooves have a semi-circular cross-section and arranged relative to one another so as to form a single composite groove of a circular cross-section. A helical wire insert 12 is received in the thus formed composite groove. Thereby, the shaft member 1 and the crown drilling member 2 are connected with one another in a thread-like manner. The crown drilling member 2 is screwed into the holding portion of the shaft member 1 for such a length that a rear end side 13 of the crown drilling member abuts against the annular shoulder 5 of the shaft member 1. Thereby, axial impacts can be transmitted in a loss free manner from the shaft member 1 to the crown drilling member 2 or to the sintered hard alloy cutting bodies 9.

The center drilling member which is coaxially arranged in the interior of the crown drilling member 2 has a cylindrical centering portion 14 or the center drill proper, and a plurality of hard alloy cutting lamellas 15 are soldered on its chip in a known manner. The tip of the centering portion 14 extends axially outwardly beyond the crown drilling member 2 by approximately 10-20 mm. The centering portion 14 extends into the interior of the crown drilling member 2 over a distance substantially equal to between 15 and 25 mm.

The centering portion 14 has an inner end at which its circular cross-section transits into a greater cross-section of a supporting portion 16. The supporting portion 16 is square shaped, or has a rectangular cross-section whose smaller side at least corresponds to the diameter of the centering portion 14.

A shoulder 17 is formed in the region of transition between the supporting portion 16 and the centering portion 14 of the center drilling member. A ring-shaped disc 18 abuts against the shoulder 17 and can be composed of metal or synthetic plastic material. An O-ring 19 composed of a material having rubber elasticity and a second disc 20 abut against the disc 18 at its end facing away from the supporting portion 16. The disc 20 may also be composed of metal or synthetic plastic material. The disc 20 forms, in connection with the shoulder 17, an axial abutment which is elastically yieldable to a certain extent, whereby the drilling depth of the center drilling member 3 is limited to a predetermined value.

The supporting portion 16 has an end facing away from the centering portion 14 and carries at this end a coaxial cylindrical guiding piece 21. The guiding piece 21 is inserted into a coaxial bore 22 provided in the holding portion 6 of the shaft member 1. The length of the guiding piece 21 corresponds in the shown embodiments approximately to the length of the holding portion 6. Thereby a good radial guidance of the center drilling member relative to the shaft member 1 is attained, similarly to the crown drilling member 2.

Figure 8:
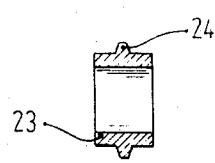
FIGS. 8 and 9 are views showing a stop ring for the center drilling member in accordance with two different embodiments.

In order to prevent unintentional dropping of the center drilling member from the bore 22, a stop ring 23 is arranged in an associated annular groove formed in an innermost portion of the guiding piece 21. As can be seen from FIG. 8, the stop ring 23 is formed as a one-piece member composed of a material having rubber elasticity such as rubber or vulcaline and having a lip 24 which extends radially beyond the outer diameter of the guiding piece 21. The lip 24 is elastically deformed during insertion of the guiding piece 21 into the bore 22. The lip 24 is dimensioned so that the center drilling member 2 cannot be withdrawn from the bore 22 either because of its weight or during no-load stroke of the hammer drill. Moreover, the lip 24 seals the interior of the bore 22 from the interior of the crown drilling member 2.

A shoulder 25 is formed in the region of transition between the cross-section of the supporting portion 16 and the cross-section of the guiding piece 21 of the center drilling member. The supporting portion 16 abuts via the shoulder 25 against associated end stop 26 on the shaft member 1. At this location, transmission of impacts from the shaft member 1 to the center drilling member 3 takes place.

The holding portion 6 of the shaft member 1 is slotted at its end facing away from the shank 4. The width of the slot 27 corresponds to the distance 28 between both longer sides of the cross-section of a supporting portion 16 with a small movement play. For facilitating insertion, the center drilling member and the flanks of the slot 27 can be provided at both sides with chamfers of 45°. When the center drilling member 3 is inserted in the bore 22, both longer sides of the supporting portion 16 lie between both flanks of the slot 27 in the holding portion 6. They form an insertion or plug coupling for transmission of the torque from the shaft member 1 to the center drilling member 3. In this manner, the guiding piece 21 of the center drilling member is completely unloaded from the transmission of the working moments, namely axial impacts and torque to the center drilling member.

The bore 22 has an inner end at which a transverse bore 29 is provided. The bore 29 communicates with the bore 22, on the one hand, and is open at both sides into a suction head 30 which is rotatingly arranged on a cylindrical outer face of the shaft member 1. The suction head 30 communicates with a source of negative pressure which is shown only schematically in the drawing. The source of negative pressure may be formed of, for example, as a dust aspirating device 31.

The drilling tool in accordance with the present invention operates in the following manner. The drilling tool is inserted into a tool receiving member of a hammer drill. Axial impacts and a torque are transmitted to the shaft member 1. For initial drilling, the center drilling member 3 is inserted into the bore 22. The center drilling member is applied to the rock to be drilled, and the drive of the hammer drill is switched on. The operator of the hammer drill drills only with the center drilling member so as to form a guiding bore for the crown drilling member. With the crown drilling member, a ring-shaped slot having the depth of approximately 5-10 mm is drilled in the rock. Then the center drilling member can be removed since the drilling tool will now be guided in the thus formed annular slot. If the operator, however, drills further, the above-described axial abutment formed for example as the disc 20 abuts against the rock. The soft damping member of rubber or vulcaline, that is the O-ring 19, absorbs the impacts of the hammer drill and the drilling tool cannot penetrate deeper into the rock. The operator is thereby forced to withdraw the hand-held machine and, after switching off of the drive, to remove the center drilling member 3 from the drilling tool. The discs 18, 19 and 20 abutting against the shoulder 17 are not removed from the center drilling member 14 inasmuch as the hard alloy cutting lamellas radially overlap the discs. After this, the drilling tool is again inserted into the annular groove in the rock. During further drilling, the dust aspirating arrangement aspirates the produced drillings into the interior of the crown drilling member 2 after opening of the bore 22 which is hermetically closed by the stop ring 23. The drillings and dust are aspirated from the bore 22 via the transverse bore 29 and the suction head 30 into the aspirating arrangement 31.

Figure 9:
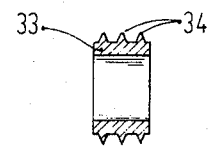

FIG. 9 shows a stop ring 33 in accordance with a second embodiment, which, in contrast to the stop ring 23, has three lips 34. This stop ring makes possible especially easy and simple insertion and withdrawal of the center drilling member into and out of the bore 22 of the shaft member 1. The three lips provide for an especially good sealing against fine dust so that it is guaranteed that the center drilling member cannot be clamped in the bore 22 of the shaft member 1 and no significant wear can take place.

Figure 10:
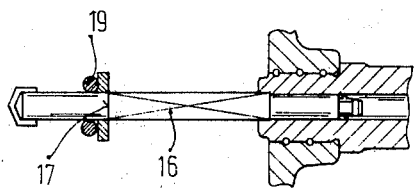
FIG. 10 is a view showing another embodiment of the center drilling member.

FIG. 10 shows a center drilling member which is substantially similar to the center drilling member of FIG. 1, but in contrast to the latter has only one metal disc 18 on which the O-ring 19 abuts. This embodiment is somewhat simpler than the first embodiment of the axial abutment because the second disc 20 is not utilized here. However, it has the disadvantage in the fact that the O-ring 19 is subjected to an increased wear.

Figure 11:
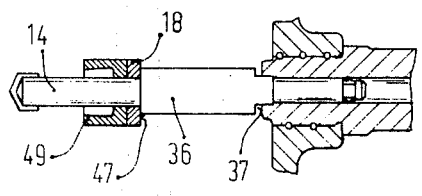

The center drilling member shown in FIG. 11 somewhat differs from the center drilling members of the previous embodiments. It has a supporting portion 36 which is cylindrical. Two cam faces 37 must be milled for torque transmisson, the cam faces 37 engaging in the slot 27 of the holding portion 6 of the shaft member 1. The supporting portion 36 is a front end provided with a centering portion which completely corresponds to the centering portion 14 of the previous embodiments. However, here a shoulder 47 in the region of transition from the greater diameter of the supporting portion 36 to the smaller diameter of the centering portion 14 is ring shaped. The shoulder 47 provides for a better abutment for the disc composed of metal. A cup-shaped member 49 of rubber or vulcaline abuts against the disc 18. The member 49 has a greater deformation potential as compared with the resiliently yieldable members of the previous embodiments. The drilling tool shown in FIG. 1 is more suitable for working in porous rocks, such as for example in pumice stone concrete or hollow blocks.

In the drilling shown in FIG. 12, a helical pressure spring 56 extends over the entire length of a cylindrical center drilling member and provides for an axial abutment at its front end 57. The helical spring 56 has a rear end 58 facing toward the receiving member of the hand-held power tool and abutting against a ring-shaped shoulder 59 formed in a center drilling member 53. The shoulder 59 is formed at a flank of an annular groove 60 which is cut out in the thickened part of the shaft of the center drilling member 53. In order to prevent dropping of the helical pressure spring 56 from the center drilling member 53, the last convolution of the rear end 58 of the helical pressure spring 56 has a smaller diameter than the remaining portion of the spring. This convolution snaps into the annular groove 60.

The helical pressure spring 56 has a relatively that characteristic line $F=f(s)$. It is so designed that in condition of a maximum pressure which operator applies onto the hand-held power tool, it cannot be compressed completely to a block. The helical pressure ring acts similarly to the previously described damping parts, such as for example the ring 19, as a damping arrangement which absorbs the axial impacts of the striking mechanism. The helical spring has the advantage in the fact that it has higher resistance and is not damaged in condition of higher working temperatures which take place in medium and heavy hammer drills after 10 seconds of operation because of the pressure and high impact energy transmission.

A drilling tool shown in FIG. 13 is provided with a ring-shaped disc 70 at a front end 67 of a helical pressure spring 66. The disc 70 is composed for example of a hardened steel. A slip-shaped or bush-shaped ring 71 having a rubber-like elasticity is arranged on the disc 70. In this drilling tool all parts of the axial abutment formed as a damping device are arranged on the shaft of the center drilling member in rotatable and axially displaceable manner. In this drilling tool the pressure and axial impacts are especially good taken up in springy manner without damaging by high temperatures.

The above-described drilling tool is shown here as operating with aspiration of dust. It is to be understood that it can also operate without dust aspirating means. The drilling efficiency of the drilling tool in condition when the center drilling member is removed is naturally considerably increased as compared with the drilling operation with the inserted central drilling member. What is important is the fact that the operator of the drilling tool in condition of not dust aspirating operation, is also forced to remove the center drilling member from the tool after the initial drilling step.

It will be understood that each of the elements described above, or two or more together, may also find a useful application in other types of constructions differing from the types described above.

While the invention has been illustrated and described as embodied in a drilling tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drilling tool, comprising a driven shaft member having an axis; a crown drilling member having an annular wall detachably mounted on said shaft member, and a plurality of cutting edges on said annular wall; a center drilling member detachably mounted on said shaft member in the interior of said crown drilling member and having a further cutting edge; means for limiting a drilling depth of the tool when said center drilling member is mounted on said shaft member;
said annular wall of said crown drilling member being hollow and cylindrical and having a front end on which said plurality of cutting edges are provided;
said limiting means including axial abutment means provided on said center drilling member;
said center drilling member defining a drilling portion provided with said further cutting edge, and a supporting portion connected with said drilling portion and having a different cross-section so that a shoulder constituting said axial abutment means is formed between said portions; and supporting portion of said center drilling member being parallelopiped-shaped and having a cross-section which exceeds that of said drilling portion.

2. A drilling tool, comprising a driven shaft member having an axis; a crown drilling member having an annular wall detachably mounted on said shaft member, and a plurality of cutting edges on said annular wall; a center drilling member detachably mounted on said shaft member in the interior of said crown drilling member and having a further cutting edge; means for limiting a drilling depth of the tool when said center drilling member is mounted on said shaft member;

said annular wall of said crown drilling member being hollow and cylindrical and having a front end on which said plurality of cutting edges are provided;

said limiting means including axial abutment means provided on said center drilling member;

said center drilling member defining a drilling portion provided with said further cutting edge, and a supporting portion connected with said drilling portion and having a different cross-section so that a shoulder constituting said axial abutment means is formed between said portions;

and said drilling portion of said center drilling member having a circular cross-section of a predetermined diameter, said supporting portion of said center drilling member having a rectangular cross-section with a smaller side corresponding to the diameter of said circular cross-section of said drilling portion.

3. A drilling tool, comprising a driven shaft member having an axis; a crown drilling member having an annular wall detachably mounted on said shaft member, and a plurality of cutting edges on said annular wall; a center drilling member detachably mounted on said shaft member in the interior of said crown drilling member and having a further cutting edge; means for limiting a drilling depth of the tool when said center drilling member is mounted on said shaft member;

torque transmitting coupling means mounting said center drilling member on said shaft member, said coupling means including flat faces provided on said center drilling member, and a holding portion provided in said shaft part and having respective faces cooperating with said flat faces of said center drilling member, said holding portion having a slot which forms said respective faces abutting against said shoulder of said center drilling member.

4. A drilling tool as defined in claim 3, wherein said crown drilling member has a receiving bore for receiving and holding said holding portion of said shaft member.

5. A drilling tool as defined in claim 4, wherein said center drilling member has a drilling portion provided with said further cutting edge, and a supporting portion connected with said drilling portion and having a rectangular cross-section differing from that of said drilling portion, said rectangular cross-section of said supporting portion of said center drilling member having long sides forming said flat faces.

6. A drilling tool as defined in claim 4, wherein said shaft member has a further receiving bore, said center drilling member having a substantially cylindrical guiding piece insertable and holdable in said further receiving bore of said shaft member; and further comprising means for preventing dropping of said center drilling member from said further receiving bore of said shaft member.

7. A drilling tool as defined in claim 6, wherein said preventing means includes an annular groove associated with said guiding piece of said center drilling member, and a stop ring arranged in said annular groove, said stop ring having at least one lip extending and resiliently deformable in a radial direction.

8. A drilling tool as defined in claim 7, wherein said said stop ring is composed of a relatively soft material having a rubber-like elasticity.

9. A drilling tool as defined in claim 8, wherein said stop ring is composed of a material selected from the group consisting of rubber and vulkolan.

10. A drilling tool, comprising a driven shaft member having an axis; a crown drilling member having an annular wall detachably mounted on said shaft member, and a plurality of cutting edges on said annular wall; a center drilling member detachably mounted on said shaft member in the interior of said crown drilling member and having a further cutting edge; means for limiting a drilling depth of the tool when said center drilling member is mounted on said shaft member;

said annular wall of said crown drilling member being hollow and cylindrical and having a front end on which said aplurality of cutting edges are provided;

said limiting means including axial abutment means provided on said center drilling member;

said center drilling member having a rear end provided with a shoulder which forms said abutment means, said limiting means further including a helical spring abutting against said shoulder of said center drilling member; and said helical spring having a front end facing toward said cutting edges, said limiting means further including a ring-shaped disc arranged at said front end of said helical spring.

11. A drilling tool as defined in claim 10, wherein said ring-shaped disc arranged at said front end of said helical spring is composed of hardened steel.

12. A drilling tool as defined in claim 10, wherein said limiting means further includes a ring composed of a material having a rubber-like elasticity and abutting against said ring-shaped disc.

13. A drilling tool as defined in claim 12, wherein said ring of said limiting means is sleeve-shaped.

14. A drilling tool as defined in claim 13, wherein said ring of said limiting means is bush-shaped.

* * * * *